United States Patent
Masghati et al.

(10) Patent No.: US 6,795,289 B2
(45) Date of Patent: Sep. 21, 2004

(54) DUAL SNEAK CURRENT PROTECTOR

(75) Inventors: Mohammad Masghati, Carol Stream, IL (US); Brian J. Truesdale, Plainfield, IL (US); Arif Oguz, Schaumburg, IL (US)

(73) Assignee: Illinois Tool Works Inc., Glenviw, IL (US)

( * ) Notice: Subject to any disclaimer, the term of this patent is extended or adjusted under 35 U.S.C. 154(b) by 249 days.

(21) Appl. No.: 10/044,029

(22) Filed: Jan. 11, 2002

(65) Prior Publication Data

US 2003/0133245 A1 Jul. 17, 2003

(51) Int. Cl.[7] .............................................. H02H 9/00
(52) U.S. Cl. ..................... 361/119; 361/56; 361/91.1; 361/111; 361/118
(58) Field of Search ................. 361/56, 18, 111, 361/113, 118, 119, 120, 127, 91.1

(56) References Cited

U.S. PATENT DOCUMENTS

| | | | | |
|---|---|---|---|---|
| 4,968,260 A | * | 11/1990 | Ingalsbe | ..................... 439/76.1 |
| 5,310,363 A | * | 5/1994 | Brownell et al. | ............ 439/676 |
| 5,493,469 A | * | 2/1996 | Lace | ........................... 361/119 |
| 5,563,761 A | * | 10/1996 | Apa et al. | .................... 361/119 |
| 5,841,620 A | * | 11/1998 | Masghati | ..................... 361/119 |

* cited by examiner

Primary Examiner—Stephen W. Jackson
(74) Attorney, Agent, or Firm—Mark W. Croll; Paul F. Donovan

(57) ABSTRACT

A voltage and/or surge-current protector and grounding bar arrangement is provided for use with a BIX connector block having two rows of terminals which are laterally spaced with respect to each other so as to form a longitudinally extending channel therebetween. The arrangement includes a housing for receiving voltage and/or surge-current protector devices, four tip/ring terminal contacts, a ground contact and a disconnect arrangement. A grounding bar is disposed within the elongated opening of the BIX connector block and extends generally throughout the length thereof. The ground contact includes two prongs which extend vertically and externally of the housing for connection to a corresponding hole in the grounding bar. The disconnect arrangement allows for testing and line-servicing without removal of the voltage and/or surge-current protector devices from the BIX connector block.

20 Claims, 6 Drawing Sheets

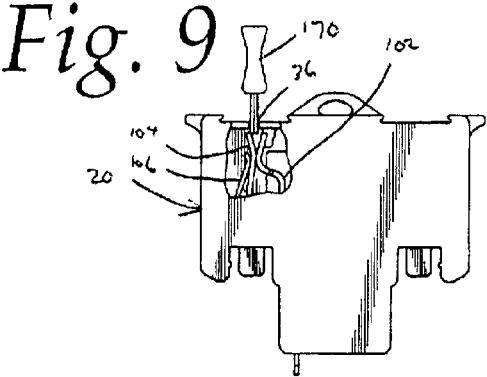
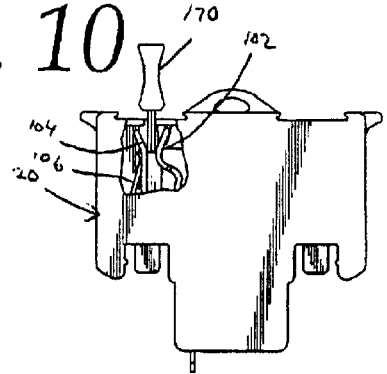
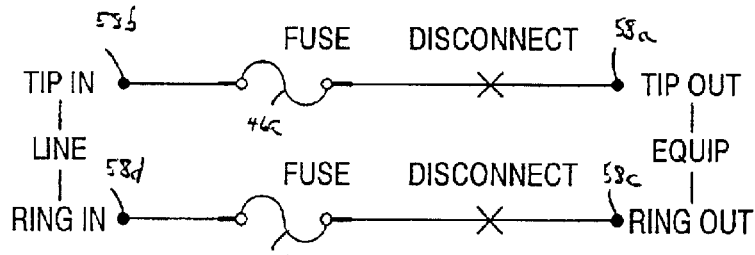
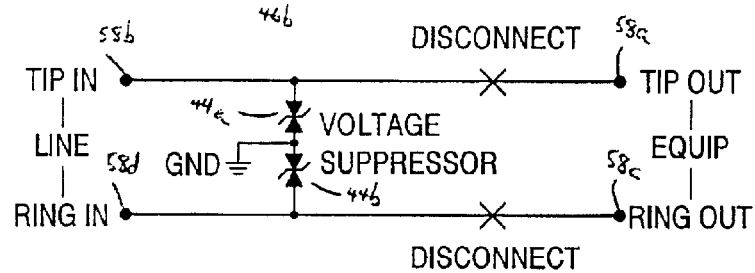
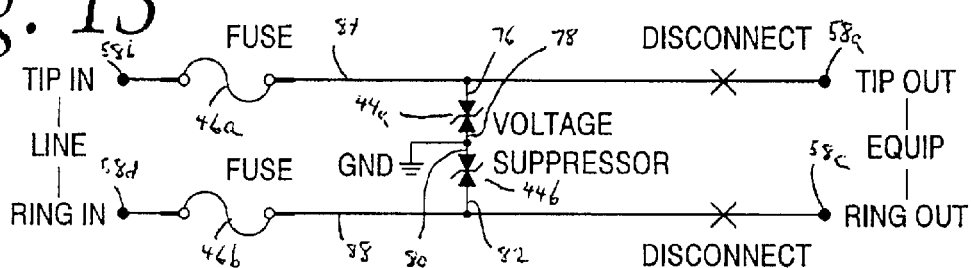
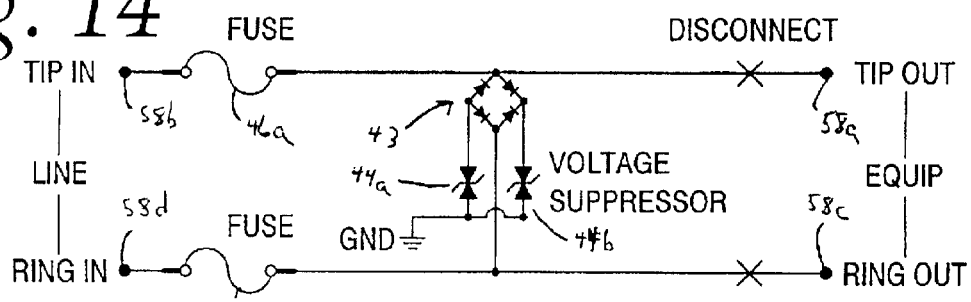

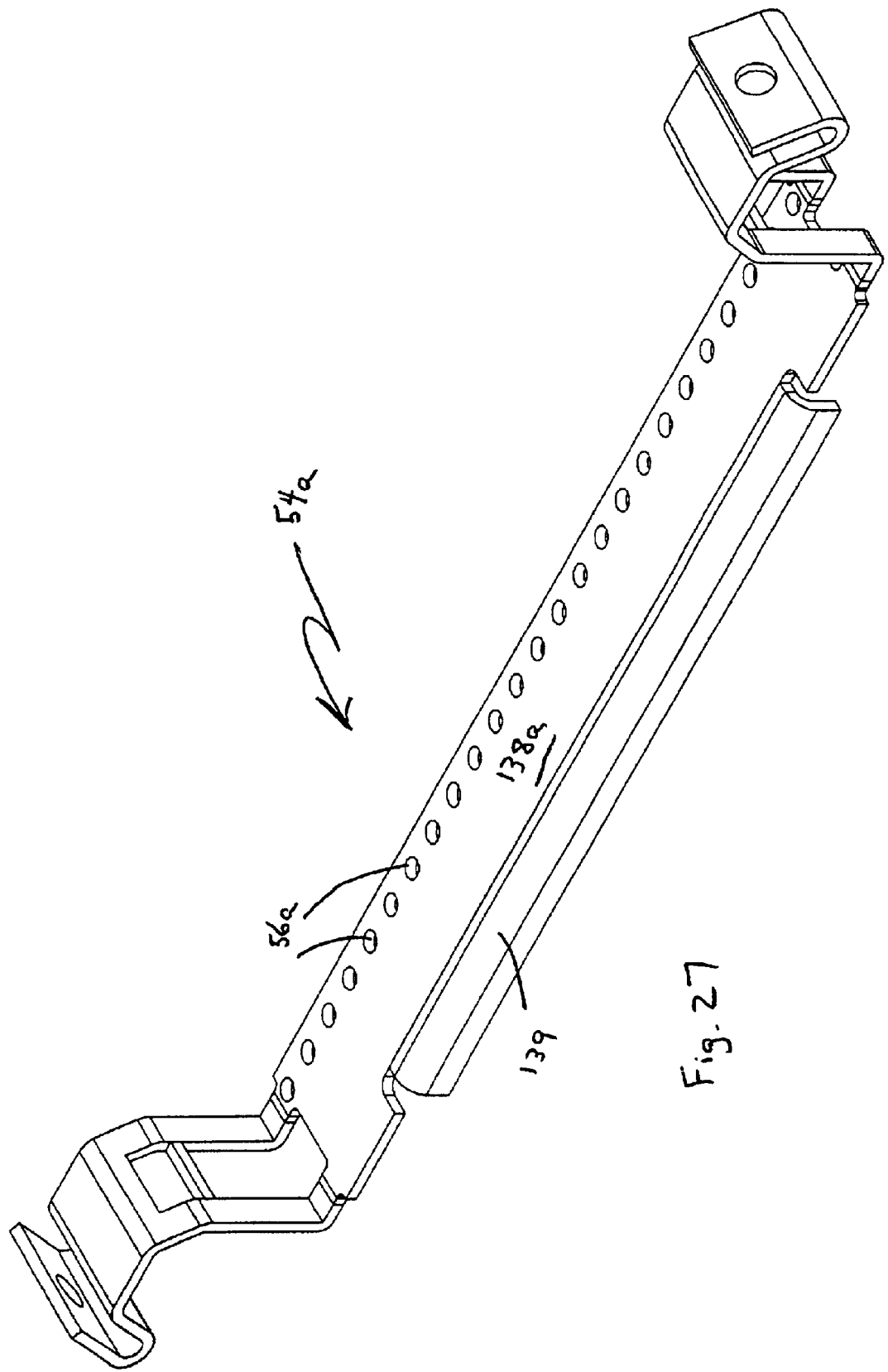

DUAL SNEAK CURRENT PROTECTOR

BACKGROUND OF THE INVENTION

1. Field of the Invention

This invention relates generally to voltage and/or surge-current protector packages. More particularly, it relates to a voltage and/or surge-current protector and grounding bar arrangement which includes a two-piece interfitting housing of a unique construction for receiving a surge-current protector device and/or an over-voltage protector device, and a grounding bar adapted to be mounted upon a BIX connector block for connection to a ground contact associated with the over-voltage protector device.

2. Description of the Prior Art

Heretofore, there has been known in the prior art of a device and structural arrangement which provides both over-current (surge-current) and over-voltage protection for use in conjunction with a telephone terminal block, conventionally referred to as an AT&T Style 110 Block. Such a voltage and/or current protector and grounding bar arrangement for the AT&T Style 110 Block is illustrated and described within U.S. Pat. No. 5,341,269 which was issued to Gregory R. Hayward et al. and is assigned to the same assignee as that of the present invention. This '269 patent is hereby incorporated by reference in its entirety which discloses a two-piece interfitting housing having an over-voltage protection device disposed therein and operatively connected to a ground contact. A strip-like grounding bar is configured so as to be able to be disposed within a longitudinally extending channel defined between two rows of laterally spaced terminals provided on the telephone terminal block. The grounding bar is provided with a longitudinally extending array of holes into which the ground contact of the two-piece housing is able to be disposed. A plurality of terminal/fuse contacts are also provided internally within the two-piece housing. A plug-in surge-current protection device, such as a fuse carrier, is operatively mounted upon the housing for connection to the terminal/fuse contacts. The terminal/fuse contacts are also interconnected to opposed terminals of the two rows of laterally spaced terminals of the telephone terminal block.

Further, there is also disclosed in the prior art U.S. Pat. No. 5,555,153 issued to Hayward et al. and assigned to the same assignee as that of the present invention. The '153 patent was based upon a Continuation-In-Part application which was filed on parent application Ser. No. 07/923,249, now the aforementioned U.S. Pat. No. 5,341,269. This '153 patent is likewise hereby incorporated by reference in its entirety which discloses a voltage protector and grounding bar arrangement for use with a telephone terminal block having at least two rows of terminals which are spaced apart from each other so as to form an elongated channel therebetween. The voltage protector and grounding bar arrangement includes a two-interfitting housing for receiving or containing an over-voltage or surge-voltage protection device therein, a ground contact, and a grounding bar adapted to be mounted upon the terminal block and to be connected to the ground contact. The grounding bar is disposed within the channel of the terminal block. Two plug-in carrier devices for mating with terminal contacts are mounted within the housing and are adapted to be connected to aligned terminals of the terminal block. The plug-in carriers may house fuses, PTC current-limiting devices, or bridging clips.

While the foregoing voltage and/or surge-current protector and grounding bar arrangements disclosed in the aforementioned '269 and '153 patents provided the necessary over-voltage and over-current protection required, it has been noted that these arrangements are especially designed to be used in conjunction with a particular or specific telephone terminal block, i.e., the AT&T Style 110 Block. Inasmuch as an alternative telephone terminal block is also commonly used within the telephone and other electronic applications, conventionally referred to as a BIX connector block which is manufactured and sold by NORDX/CDT (a subsidiary of Cable Design Technologies), it would be desirable to provide a new voltage and/or surge-current protector and grounding bar arrangement which can be used in conjunction with a BIX connector block.

It has also been noted that the prior art arrangements utilized separate, plug-in, surge-current carriers which are adapted to be received by the upper portion of the two-piece interfitting housing. In order to simplify manufacture of the separate carriers and housings as well as to minimize assembly or labor costs, it would also be expedient to provide a housing of a unique construction which will accommodate an over-current device and/or over-voltage device with a single standardized or uniform housing in lieu of separate plug-in carriers mounted on a housing. Further, in the prior art arrangements a label designating the various ones of the 25-pair protectors is typically installed underneath the protectors and on the top surface of the grounding bar. Thus, when all of the 25-pair protectors are inserted or punched down into corresponding ones of the openings in the grounding bar the label will be hidden from view. Accordingly, it would be also desirable to provide a label strip which can be placed on top of the housings of the 25-pair protectors so that it can be visually seen without requiring prior removal of the protectors from the telephone terminal block.

SUMMARY OF THE INVENTION

Accordingly, it is a general object of the present invention to provide a new and improved voltage and/or surge-current protector and grounding bar arrangement for use in conjunction with a BIX connector block which is relatively simple and economical to manufacture and assemble.

It is an object of the present invention to provide a new and improved voltage and/or surge-current protector and grounding bar arrangement for a BIX connector block in which over-current protection and/or over-voltage protection is provided.

It is another object of the present invention to provide a new and improved voltage and/or surge-current protector and grounding bar arrangement which includes a housing of a unique construction which will accommodate an over-current device and/or over-voltage device with a single standardized housing.

It is still another object of the present invention to provide a new and improved voltage and/or surge-current protector and grounding bar arrangement which includes a label strip which can be placed on top of the housings of the 25-pair protectors so that it can be visually seen without requiring prior removal of the protectors from the telephone terminal block.

It is yet still another object of the present invention to provide a new and improved voltage and/or surge-current protector and grounding bar arrangement which includes a disconnect arrangement for allowing testing and line-servicing without removal of a voltage and/or surge-current protector from a telephone terminal block.

In a preferred embodiment of the present invention, there is provided a voltage and/or surge-current protector and grounding bar arrangement for use with a BIX connector block having two rows of terminals which are laterally spaced apart with respect to each other so as to form a longitudinally extending channel therebetween. A grounding bar is disposed within the longitudinally extending channel defined between the two laterally spaced rows of terminals and includes a plurality of holes defined therein. Voltage and/or surge-current protector devices are disposed within a housing.

A plurality of tip/ring terminal contacts are also disposed within the housing for mating with opposed terminals of the BIX connector block, disposed upon opposite sides of the longitudinally extending channel, when the housing is mounted upon the BIX connector block. A ground contact is disposed within the housing for connection to the voltage and/or surge-current protector devices and to one of the plurality of holes defined within the grounding bar.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 9 is a top plan view of the housing of FIG. 2, showing a test probe inserted into the housing but prior to breaking the disconnect contacts;

FIG. 10 is a view similar to FIG. 9, but showing the test probe inserted into the housing and breaking the disconnect contacts for allowing tests in two directions;

FIG. 11 is a schematic circuit diagram of the protection circuitry contained within the housing of FIG. 2 for use as a dual sneak-current protector in conjunction with the disconnect contacts;

FIG. 12 is a schematic circuit diagram of the protection circuitry contained within the housing of FIG. 2 for use as an over-voltage protector in conjunction with the disconnect contacts;

FIG. 13 is a schematic circuit diagram of the protection circuitry contained within the housing of FIG. 2 for use as a sneak-current and over-voltage protector in conjunction with the disconnect contacts;

FIG. 14 is a schematic circuit diagram of the protection circuitry contained within the housing of FIG. 2 for use as a high-speed sneak-current and over-voltage protector in conjunction with the disconnect contacts;

FIG. 27 is a perspective view of a second embodiment of the grounding bar forming a part of the present invention.

DESCRIPTION OF THE PREFERRED EMBODIMENTS

Figure 1:
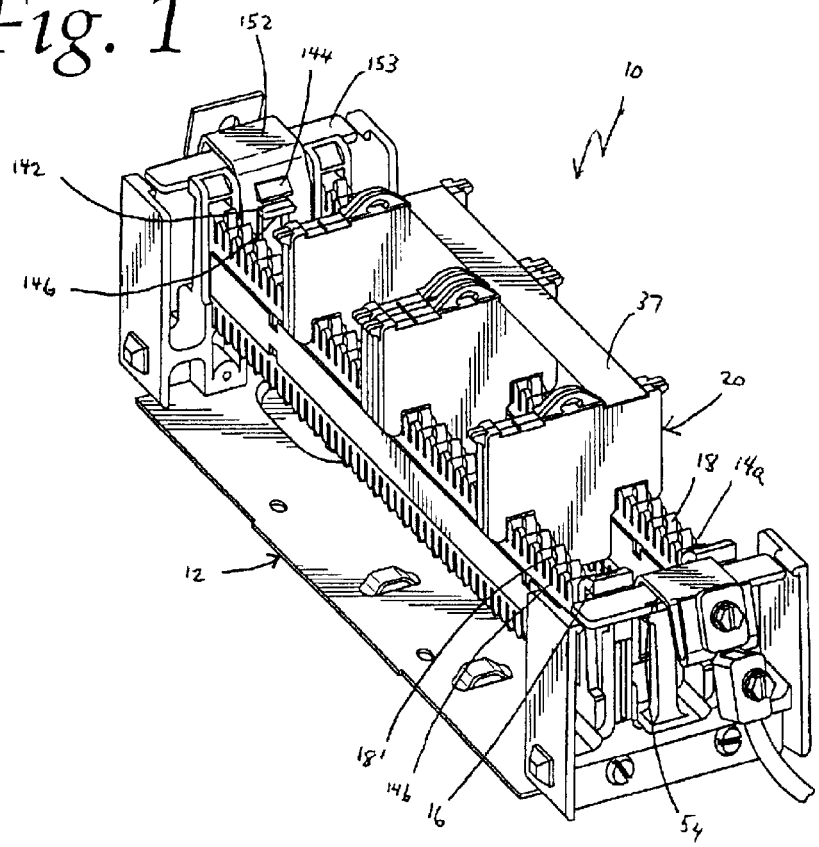
FIG. 1 is a perspective view of a voltage and/or surge-current protector and grounding bar arrangement, constructed in accordance with the principles of the present invention.

Referring now in detail to the various views of the drawings and in particular to FIGS. 1 through 5, there is shown a voltage and/or surge-current protector and grounding arrangement constructed in accordance with the principles of the present invention which is designated generally by reference numeral 10. The arrangement 10 is intended for physical and electrical association with a telephone terminal block, referred to as a BIX connector block, manufactured and sold by NORDX/CDT, which is commonly used within telephone circuitry and other electronic applications or systems. As can be seen from FIG. 1, the terminal block or BIX connector block 12 comprises a pair of rows 14a, 14b of terminals which are laterally spaced apart with respect to each other so as to form an elongated or longitudinally extending channel 16 therebetween.

Each of the respective rows 14a, 14b is provided correspondingly with a plurality of longitudinally aligned terminals 18, 18'. The terminals 18 in the row 14a are disposed in alignment laterally with the opposed terminal 18' in the row 14b. Thus, each set of the corresponding, laterally opposed or aligned terminals 18, 18' define a terminal pair. As will be seen hereinbelow, the voltage and/or surge-current protector and grounding bar arrangement 10 of the present invention suitably interconnects with up to 25-terminal pairs (opposed terminals 18, 18' in the rows 14a, 14b) so as to protect sensitive telecommunication equipment from over-voltage and/or over-current conditions on incoming voice and data lines.

The voltage and/or surge-current protector and grounding bar arrangement 10 includes a plastic housing 20 made of a suitable material such as, for example, a fire-retardant polymer, and is comprised of two co-mating front and back halves 22, 24. The two housing halves 22 and 24 are identical in their construction, which are assembled to each other and are ultimately sonically welded together. The housing 20 includes a lower portion 26, a middle body portion 28, and an upper test port portion 30. The lower portion 26 is adapted to be plugged into the BIX connector block 12 during use. The upper test port portion 30 includes a pair of top recesses 32a, 32b which are separated by an arch-shaped handle 34. The top recess 32a includes a slit 36 for receipt of a test probe for testing and line-servicing without removal of the housing 20 from the terminal block 12, as will be explained more fully hereinafter. The top recess 32b is adapted to receive slidably a 25-terminal pair identification label strip 37 to provide single terminal pair identification of up to 25-terminal pairs. The terminal pair identification on the label strip 37 is visible without removal of the housing 20 from the terminal block 12.

Figure 22:
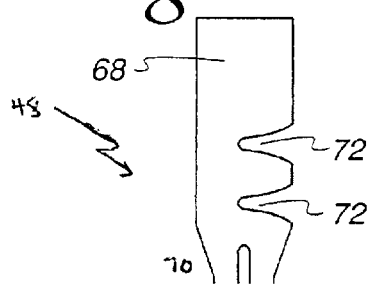
FIG. 22 is a top view of the ground contact of FIG. 21, taken along the lines 22—22 of FIG. 21.
Figure 21:
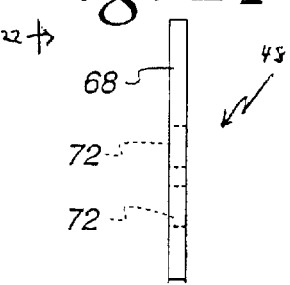
FIG. 21 is a side view of the ground contact forming a part of the present invention.
Figure 23:
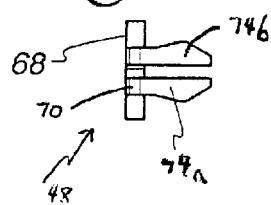
FIG. 23 is an end view of the ground contact of FIG. 21, taken along the lines 23—23 of FIG. 21.

The front and back halves 22 and 24 of the housing 20 are provided with confronting and interfitting sidewall members 38 and 40, respectively, and are also provided with a recessed rear wall member 42. The sidewall members 38, 40 and rear wall member 42 are all formed integrally together so as to effectively define a cavity for receiving and enclosing a pair of voltage suppressors 44a, 44b such as sidactors or silicon avalanche suppressors similar to type 1.5KE and a pair of sneak-current fuses 46a, 46b or any number of different single or combined components in order to create other protector products using the same standardized housing 20. A ground contact 48 is provided for reasons that will be apparent which is used in conjunction and interconnects with the voltage suppressors 44a, 44b and which extends through the lower portion 26 of a housing chamber 50 by means of suitable slot 52 formed therein. A strip-like grounding bar 54 is adapted to be disposed within the elongated or longitudinally extending channel 16 defined between the two rows 14a and 14b of the BIX connector block 12. The grounding bar 54 is provided with a plurality of serially aligned openings 56 for receiving therein the spaced-apart prongs 74a, 74b (see FIGS. 21–23) of the corresponding ground contacts 48.

Figure 3:
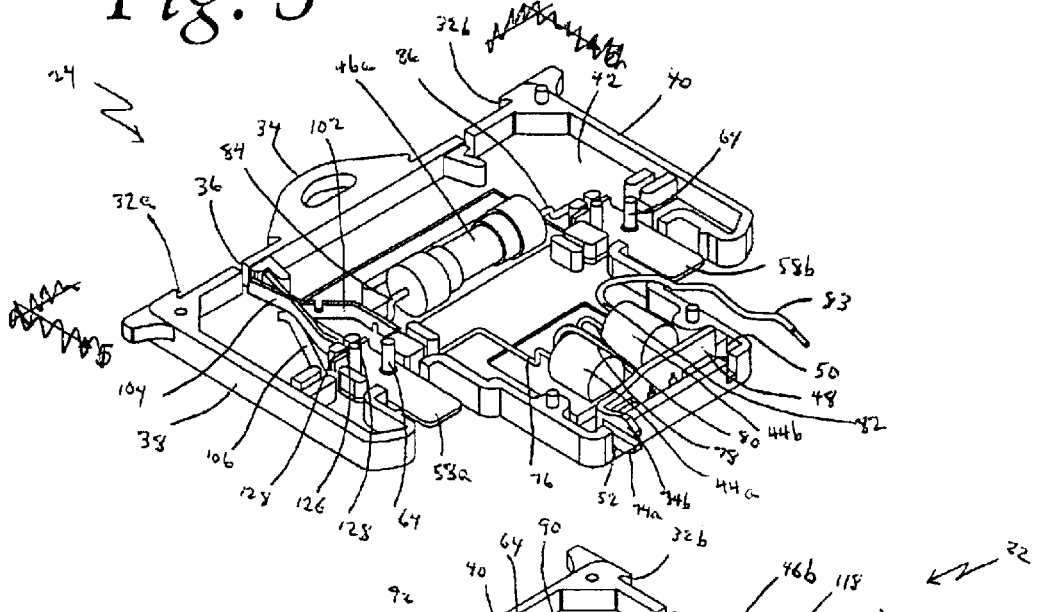
FIG. 3 is a front, perspective view of the back half assembled with certain electrical components of the housing of FIG. 1.
Figure 4:
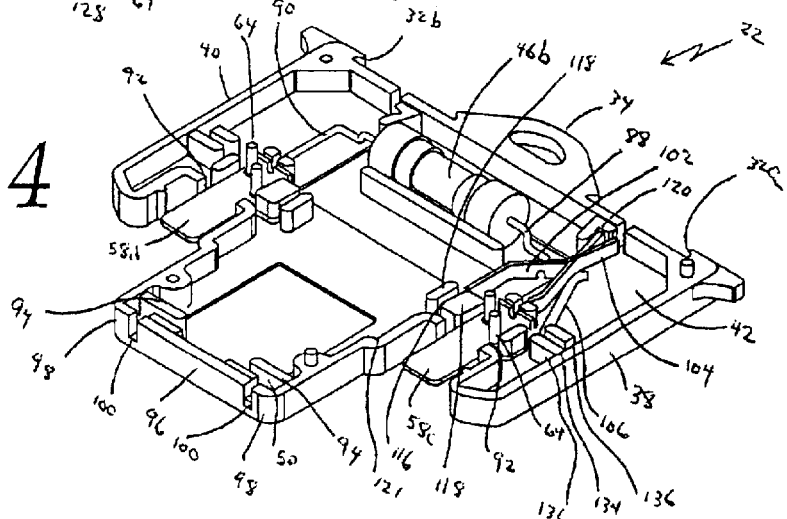
FIG. 4 is a front, perspective view of the front half assembled with certain other electrical components of the housing of FIG. 1.
Figure 5:
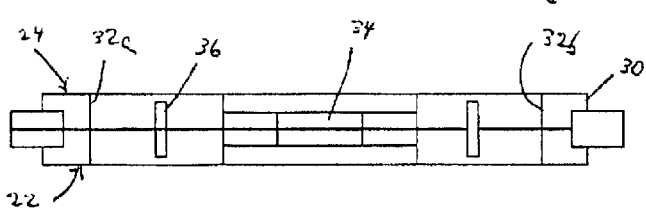
FIG. 5 is a top plan view, taken along the lines 5—5 of FIG. 2, with the label strip removed.
Figure 18:
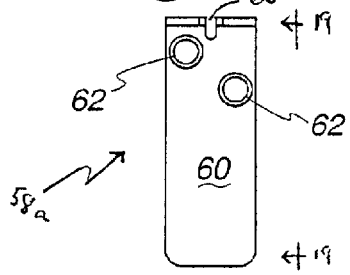
FIG. 18 is a front view of one of the tip/ring terminal contacts forming a part of the present invention.
Figure 19:
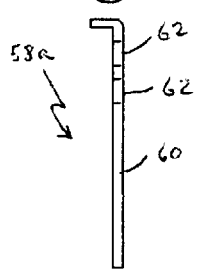
FIG. 19 is a side view of the terminal contact of FIG. 18, taken along the lines 19—19 of FIG. 18.
Figure 20:
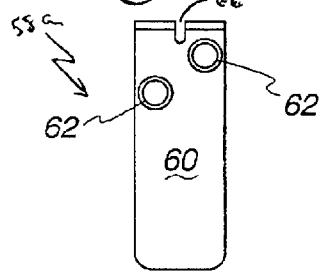
FIG. 20 is a back view of the terminal contact of FIG. 18.

The lower part of the middle body portion 28 in the front and back halves 22, 24 are provided with four tip/ring terminal contacts 58a–58d. The terminal contacts 58a–58d shown in FIGS. 3 and 4 are all identical and one of them is depicted in full detail in FIGS. 18–20. The terminal contacts are preferably formed from phosphor-bronze strip metal are tin plated for solderability. Each of the terminal contacts includes a flat body portion 60 which has mounting holes 62 formed therein for receiving mounting posts 64 disposed in the body portion 28. At the upper edge of the body portion 60, there is provided a vertical slit 66 for receiving therein a part of other components.

A ground contact 48 is stamped from non-ferrous sheet metal and is likewise made from a phosphor-bronze strip metal similar to the tip/ring terminal contacts 58a–58d. The ground contact 48 is shown in FIG. 3 and is illustrated in full detail in FIGS. 21–23. As can be seen from the latter Figures of the drawings, the ground contact 48 has a L-shaped configuration formed of a horizontally-extending leg portion 68 and a downwardly extending leg portion 70. The leg portion 68 includes a pair of notches 72 for receiving terminal leads of electrical components. The leg portion 70 is formed by a pair of spaced-apart prongs 74a, 74b which extend integrally from one end of the horizontal leg portion 68. The ground contact 48 extends horizontally inside the chamber 50 in the lower portion 26 of the housing 20.

The voltage suppressor 44a such as, for example, the sidactor or silicon avalanche suppressor has terminal pin leads 76 and 78 extending therefrom. Similarly, the voltage suppressor 44b has terminal pin leads 80 and 82 extending therefrom. The sneak-current fuse 46a is provided with end leads 84, 86 and the sneak-current fuse 46b is provided with end leads 88, 90.

The lower part of the middle body portion 28 of the housing halves is formed with a pair of laterally spaced, vertical cavities 92 disposed on each side of the lower portion 26 of the housing halves. The four tip/ring terminal contacts 58a–58b are received within the respective two vertical cavities 92 in the front and back housing halves 22, 24. It will be noted that the mounting posts 64 formed in the respective housing halves extend through the corresponding mounting openings 62 in the tip/ring terminal contacts 48 so as to properly maintain the opposed terminal contacts of each of pair contacts separated from each other.

The chamber 50 in the lower portion 26 of the housing halves is defined by upper wall sections 94, a lower wall 96, and end wall portions 98 so as to retain the ground contact 48 therein against any movement. The lower wall 96 has slots 100 formed therein. It will be noted that the pair of spaced-apart prongs 74a, 74b extend vertically downwardly through one of the slots 100 defined within the lower wall 96 of the chamber 50 so as to engage in an offset manner with the corresponding one of the plurality of aligned openings 56 in the grounding bar 54. (See FIG. 2).

Figure 24:
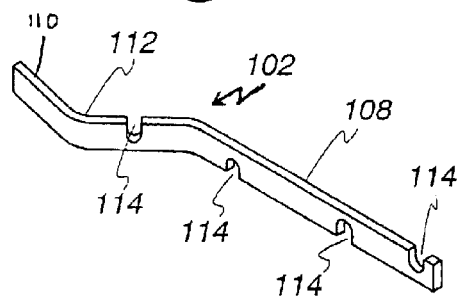
FIG. 24 is an enlarged perspective view of the long disconnect terminal contact of FIG. 3.

The middle body portions 28 in the housing halves 22, 24 are also provided with a disconnection arrangement which is comprised of a long disconnect terminal contact 102, a short disconnect terminal contact 104, and a spring contact 106. All of the contacts 102–106 shown in FIGS. 3 and 4 are illustrated in complete detail in the perspective views of FIGS. 24–26. In particular, in FIG. 24 each of the long disconnect tunnel contacts 102 (one of which is being depicted) is preferably formed from a suitable phosphor-bronze strip metal and is tin-plated for solderability and corrosion resistance. The terminal contact 102 includes a long, lower narrow leg 108, a short upper narrow leg 110, and an angled bight portion 112 joining the legs 108 and 110. The lower leg 108 and the bight portion 112 forms with a number of slits 114 for receiving therein appropriate terminal leads of electrical components. It can be seen that the terminal contact 102 extends vertically through a vertical slot 116 defined by opposed supports 118 disposed in the middle body portion 28 of the housing halves 22, 24. Further, the upper and lower ends of the terminal contact 102 abut against respective retaining lips 120, 121 so as to maintain the terminal contact 102 in place.

Figure 25:
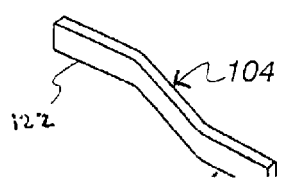
FIG. 25 is an enlarged, perspective view of the short disconnect terminal contact of FIG. 3.

In FIG. 25, each of the short disconnect terminal contacts 104 (one of which is being depicted) is made similar to the terminal contact 102 and is likewise preferably formed from a suitable phosphor-bronze strip metal and is tin-plated for solderability and corrosion resistance. The terminal contact 104 is defined by an arcuate-shaped leg having an upper end 122 disposed in contact engagement with the short upper narrow leg 110 of the terminal contact 102 and a lower end 124 extending through a vertical slot 126 defined by opposed supports 128 so as to be in contact engagement with one of the output tip/ring terminal contacts 58a or 58c.

Figure 26:
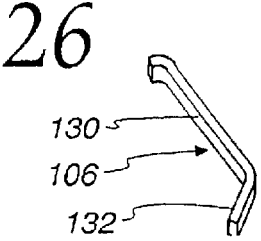
FIG. 26 is an enlarged, perspective view of the ring contact of FIG. 3.

In FIG. 26, each of the spring contacts 106 (one of which is being depicted) is preferably formed of a bent wire made of a metallic material or other suitable resilient material. The spring contact 106 has a generally L-shaped construction formed of a longer, vertical leg portion 130 and a shorter horizontal leg portion 132. Normally, the shorter leg portion 132 is held in a horizontal slot 134 defined by opposed supports 136 which are disposed in the middle body portion 28 of the housing halves so that the longer leg portion 130 is urged contactly against the upper end 122 of the terminal contact 104. As a result, the upper end 122 of the terminal contact 104 will be in contact engagement with the upper narrow leg portion 110 of the terminal contact 102.

Figure 2:
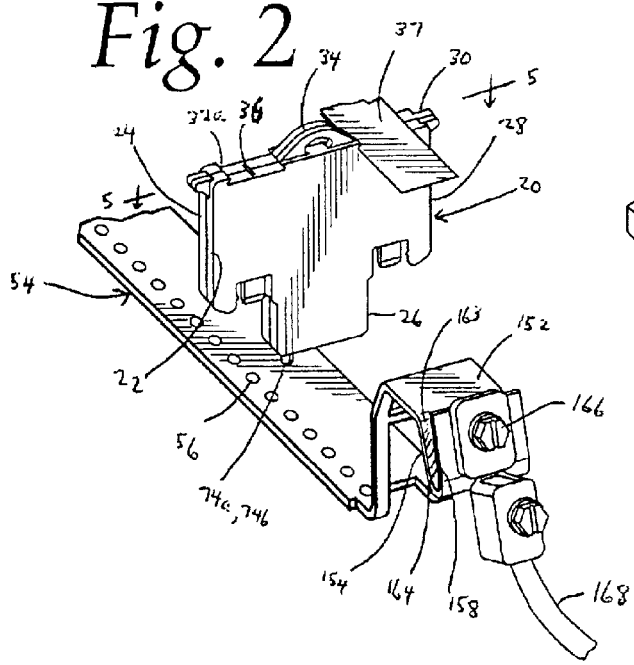
FIG. 2 is an enlarged, perspective view of a portion of the arrangement of FIG. 1.
Figure 15:
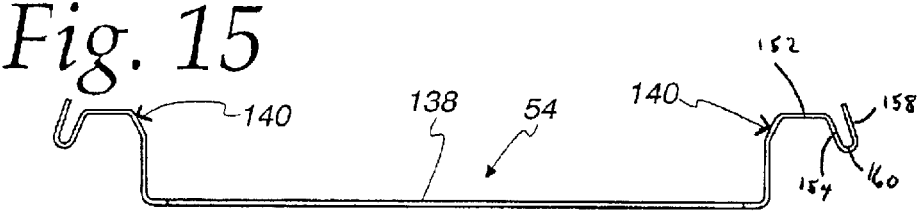
FIG. 15 is a side view of the grounding bar forming a part of the present invention.
Figure 16:
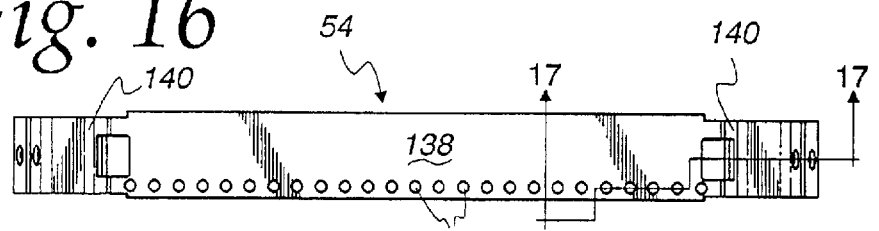
FIG. 16 is a top plan view of the grounding bar of FIG. 15, taken along the lines 16—16 of FIG. 15.
Figure 17:
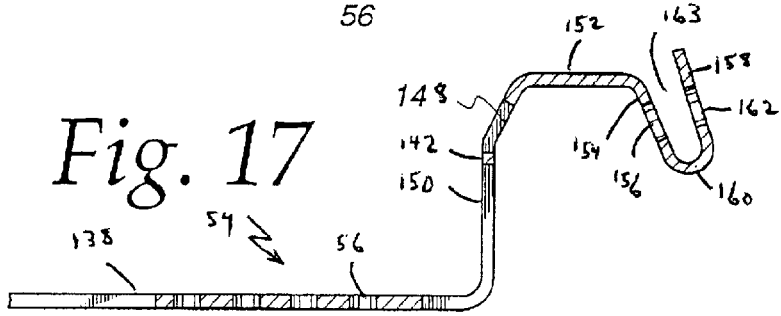
FIG. 17 is a cross-sectional view of a portion of the grounding bar of FIG. 15, taken along the lines 17—17 of FIG. 16.

The grounding bar 54 is fabricated from a suitable non-ferrous metal strip, such as, for example, copper and is formed so as to have the configuration or structure partially depicted in FIGS. 1 and 2 and depicted in full detail in FIGS. 15–17. Specifically, the grounding bar 54 includes an elongated flat horizontal intermediate section 138 and a pair of terminal end sections 140 integrally connected to the opposite ends of the intermediate section 138. The intermediate section 138 is provided with the plurality of serially-aligned offset holes or openings 56 for receiving therein the spaced-apart prongs 74a, 74b of the ground contact 48, as can best be seen from FIG. 2. The grounding bar 54 is disposed within the channel 16 (FIG. 1) defined between the two rows 14a and 14b so as to extend substantially throughout the length of the BIX connector block 12.

With particular reference to FIG. 17, the terminal end portion 140 has a vertical offset 142 which is especially designed to be interposed or press fitted between protuberances 144 and 146 located at each end of the BIX connector block 12 and is integrally joined to the respective ends of the intermediate section 138. Above and below the vertical offset 142, there are provided respective rectangularly-shaped apertures 148, 150 through which the corresponding protuberances 144, 146 extend for fixedly securing the grounding bar 54 within the channel 16. It will be noted that a horizontal top wall 152 is connected integrally to the upper end of the vertical offset 142. The top wall 152 rests upon an end frame member 153 of the connector block 12 and extends outwardly therefrom.

A first angularly-disposed connecting flange 154 is joined integrally to the outer end of the top wall 152 and extends downwardly therefrom. The connecting flange 154 is provided with a central aperture 156. A second angularly-disposed connecting flange 158 is disposed parallel to, but spaced apart from, the first angularly-disposed connecting flange 154. The second flange 158 is also integrally connected to the lower end of the first flange 154 by means of a U-shaped connecting portion 160. A central aperture 162 is provided within the second connecting flange 158 which is aligned with the central aperture 156 of the first flange 154. A slot 163 is effectively defined between the first and second spaced apart flanges 154, 158 and thus also between the aligned central apertures 156, 162.

A square nut 164 is disposed within the slot 163, and a screw 166 is initially inserted through the aperture 162 of the second flange 158 so as to be threaded through the nut 164. Then, the screw 166 subsequently extends through the aperture 156 in the first flange 154 so as to captivate the square nut 164. A common ground bus wire 168 may be readily coupled to the head of the screw 166 mountable at either terminal end section 140 of the grounding bar 54.

As was previously pointed out, unlike the prior art which utilized separate plug-in type fuse carriers, the fuses 46a, 46b of the present invention are mounted within the middle body portion 28 of the housing 20 in order to reduce manufacturing and assembly costs. Referring now back to FIGS. 3 and 4, it can be seen that the middle body portion 28 has a cavity defined therein for accommodating the pair of sneak-current fuses 46a, 46b. Further, the handle member 34 is integrally formed upon the upper surface of the upper test port portion 30 of the housing 20 so as to enable a user to grasp the housing 20 during a handling or transportation mode or to facilitate the insertion into and removal from the aligned terminals 18, 18' and the grounding bar 54 of the BIX connector block 12.

For assembly, the four tip/ring terminal contacts 58a–58d, ground contact 48, voltage suppressors 44a, 44b, sneak-current fuses 46a, 46b, long disconnect terminal contacts 102, short disconnect terminal contacts 104, and spring contacts 106 are all positioned appropriately in the respective two halves 22, 24 of the housing 20, as shown in FIGS. 3 and 4. Next, the electrical components are suitably soldered together so as to make the appropriate electrical connections as illustrated in the schematic circuit diagram of FIG. 13. For example, the terminal pin leads 76 and 78 of the voltage suppressor 44a are connected by solder to the respective disconnect terminal contact 102 and the ground contact 48. Similarly, the terminal pin leads 80 and 82 of the voltage suppressor 44b are connected by solder to the respective ground contact 48 and the disconnect terminal contact 102b via a jumper wire 83. The sneak-current fuse 46a has its terminal pin leads 84, 86 connected by solder to the respective disconnect terminal contact 102a and to the input tip terminal contact 58b. Also, the fuse 46b has its terminal pin leads 88, 90 connected by solder to the respective disconnect terminal contact 102b and the input ring terminal contact 58d.

Then, the housing halves 22, 24 are brought together so as to sandwich all of the electrical components therebetween. Thereafter, a sonic welding process is used to fixedly secure the two halves of the housing 20 together. The prongs 74a, 74b of the ground contact 48 extend externally and vertically from the lower portion 26 of the housing 20 and are inserted or press fitted into one of the openings 56 in the horizontal member 138 of the grounding bar 54 which is mounted in the BIX connector block 12. Finally, the label strip 37 is installed within the recesses 32b formed in the upper portion 30 of the housing 20. In this manner, the voltage and/or sneak-current protector and grounding bar arrangement 10 of FIG. 1 is thus formed and is illustrated in the schematic circuit diagram of FIG. 13.

With respect to FIGS. 9 and 10 as well as to FIGS. 3 and 4, the operation of the disconnect arrangement of the present invention which allows for look-both-ways testing and line servicing without removal of the protector housing 20 from the terminal block 12 will now be explained. In FIG. 9, a conventional single-sided test probe 170 has been placed into the test port 36 but has not been engaged with the disconnect terminal contacts 102 and 104. Accordingly, the short disconnect contact terminal 104 in FIGS. 3 and 4 will be in contact engagement with the long disconnect contact terminal 102 due to the force of the spring contact 106 being urged upon it. In FIG. 10, the test probe 170 is inserted between the disconnect terminal contacts 102, 104 so as to break or disengage their contact engagement. The long disconnect terminal contact 102 of FIGS. 3 and 4 will become disengaged from the short disconnect terminal contact 104 due to the interaction of the test probe 170. As a result, the connections between the tip/ring input (line side) and output (equipment side) terminals are disconnected which permits the testing on both the line side and on the equipment side.

Figure 6:
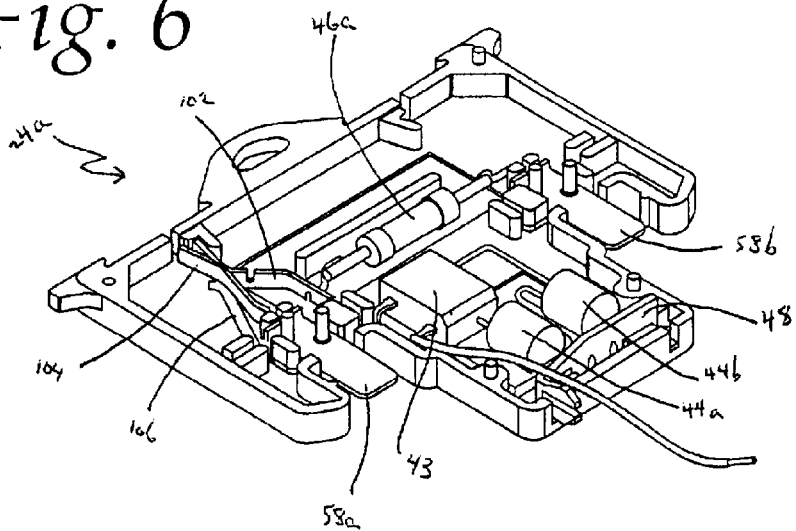
FIG. 6 is a front, perspective view, similar to FIG. 3, but with the electrical components thereof assembled therein for use as a high speed protector assembly.
Figure 7:
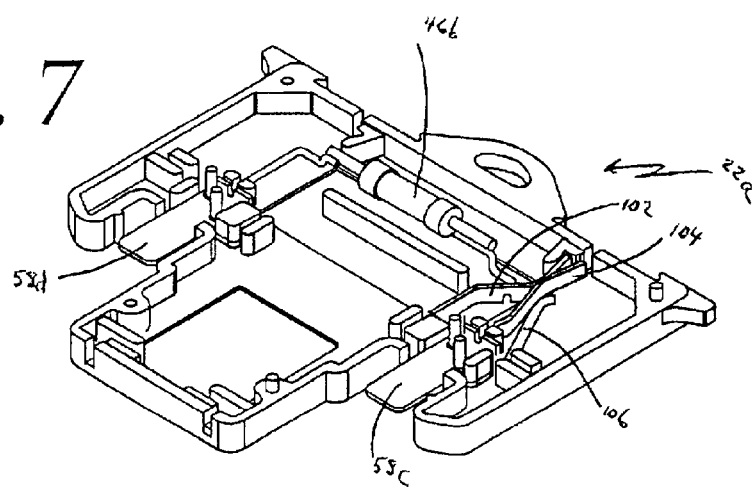
FIG. 7 is a front, perspective view, similar to FIG. 4, but showing certain other electrical components thereof assembled therein for use as a high speed protector assembly.

With reference now being made to FIGS. 6 and 7, in those applications where the protector arrangement requires a high-speed, high-frequency operation, a diode bridge rectifier 43 has been added within the housing half 24a of the housing. Except for this difference, the remaining components or elements disposed in the housing halves 22a, 24a and their electrical interconnection are substantially identical to those of the housing 20 illustrated in FIGS. 3 and 4. It should be noted that in order to simplify manufacturing of the housing halves 22a, 24a and to further minimize manufacturing cost the standardized or uniform housing halves 22, 24 of FIGS. 3 and 4 are used regardless of whether or not the housing halves are required to accommodate the diode bridge rectifier 43. FIG. 14 is a schematic circuit diagram, similar to FIG. 13, but illustrates the additional diode bridge rectifier 43 being connected electrically between the tip and ring connections.

Figure 8:
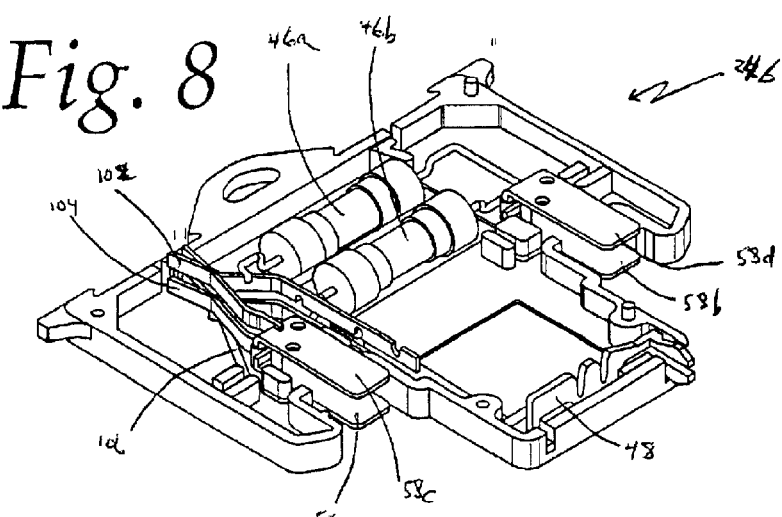
FIG. 8 is a front, perspective view, similar to those of FIGS. 3 and 5, but showing the electrical components thereof assembled therein for use as a dual sneak-current protector.

With reference to FIG. 8, it is sometimes desirable to provide only sneak-current or over-current protection without requiring the need of over-voltage protection to be provided within the same housing half 24b. In this instance, the voltage suppressors 44a, 44b of FIG. 3 are eliminated. It will also be noted that the ground contact 48 in the housing half 24b is not required to be joined to any other component for connection to the grounding bar 48. FIG. 11 is a schematic circuit diagram, similar to FIG. 13, but depicting only the sneak-current fuses 46a, 46b, the voltage suppressors being eliminated. It is also sometimes desirable to provide only over-voltage protection without requiring the need of over-current protection to be placed within the same housing 20. Accordingly, FIG. 12 is a schematic circuit diagram, similar to FIG. 13, but illustrating only the voltage suppressors 44a, 44b with the fuses being eliminated.

In FIG. 27, there is shown a perspective view of a second embodiment of a grounding bar 54a which is substantially identical to the grounding bar 54 illustrated in FIGS. 15–17 except that a part of the elongated flat horizontal intermediate section 138a is bent or folded downwardly so as to define a reinforcement rib 139. The reinforcement rib 139 serves as a support element so as to prevent a downward bending of the intermediate section 138a during insertion of the housing 20 into one of the openings 56a of the grounding bar 54a.

From the foregoing detailed description, it can thus be seen that the present invention provides a voltage and/or surge-current protector and grounding bar arrangement for use with a BIX connector block having two rows of terminals which are laterally spaced apart with respect to each other so as to form a longitudinally extending channel therebetween. The arrangement includes a grounding bar disposed within the longitudinally extending channel defined between the two laterally spaced rows of terminals and has a plurality of holes defined therein. Voltage and/or surge-current protector devices are disposed within a housing. A plurality of tip/ring terminal contacts are also disposed within the housing for mating with opposed terminals of the BIX connector block, disposed upon opposite sides of the longitudinally extending channel, when the housing is mounted upon the BIX connector block. A ground contact is disposed also within the housing for connection to the voltage and/or surge current protector devices and to one of the plurality of holes defined within the grounding bar.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A voltage and/or surge-current protector and grounding bar arrangement for use with a BIX connector block, comprising in combination:

a BIX connector block having two rows of terminals which are laterally spaced apart with respect to each other so as to form a longitudinally extending channel therebetween;

a grounding bar disposed within said longitudinally extending channel defined between said two laterally spaced rows of terminals and having a plurality of holes defined therein;

a housing;

voltage and/or surge-current protector means disposed within said housing;

a plurality of tip/ring terminal contacts disposed within said housing for mating with opposed terminals of said BIX connector block, disposed upon opposite sides of said longitudinally extending channel, when said housing is mounted upon said BIX connector block; and ground contact means disposed within said housing for connection to said voltage and surge-current protector means and to one of said plurality of holes defined within said grounding bar.

2. A voltage and/or surge-current protector and grounding bar arrangement as claimed in claim 1, wherein said housing includes a pair of co-mating front and back halves.

3. A voltage and/or surge-current protector and grounding bar arrangement as claimed in claim 1, wherein said voltage and/or surge-current protector means comprises a pair of voltage suppressor means and a pair of sneak-current fuses so as to provide over-voltage and over-current protection for said BIX connector block.

4. A voltage and/or surge-current protector and grounding bar arrangement as claimed in claim 1, wherein said voltage and/or surge-current protector means comprises rectifying means, a pair of voltage suppressor means, and a pair of sneak-current fuses so as to provide over-voltage and over-current protection for said BIX connector block.

5. A voltage and/or surge-current protector and grounding bar arrangement as claimed in claim 1, wherein said voltage and/or surge-current protector means comprises a pair of voltage suppressor means so as to provide over-voltage protection for said BIX connector block.

6. A voltage and/or surge-current protector and grounding bar arrangement as claimed in claim 1, wherein said voltage and/or surge-current protector means comprises a pair of sneak-current fuses so as to provide over-current protection for said BIX connector block.

7. A voltage and/or surge-current protector and grounding bar arrangement as claimed in claim 3, wherein said pair of voltage suppressor means comprises a pair of silicon avalanche suppressors.

8. A voltage and/or surge-current protector and grounding bar arrangement as claimed in claim 4, wherein said rectifying means comprises a diode bridge rectifier and said pair of voltage suppressor means comprises a pair of silicon avalanche suppressors.

9. A voltage and/or surge-current protector and grounding bar arrangement as claimed in claim 1, further comprising disconnect means disposed within said housing for allowing testing and line-servicing without removal of said voltage and/or surge current protector means from said BIX connector block.

10. A voltage and/or surge-current protector and grounding bar arrangement as claimed in claim 9, wherein said disconnect means comprises a long disconnect terminal contact, a short disconnect terminal contact, and a spring contact, said spring contact urging said short disconnect terminal contact into contact engagement with said long disconnect terminal contact when no testing is being performed.

11. A voltage and/or surge-current protector and grounding bar arrangement as claimed in claim 1, wherein an upper portion of said housing has a test port for receiving therein a test probe for permitting testing.

12. A voltage and/or surge-current protector and grounding bar arrangement as claimed in claim 1, wherein an upper portion of said housing has a recess for receiving therein a label strip so as to allow for single pair identification of up to 25 terminal-pairs which is visible without removal of said voltage and/or surge-current protector means from said BIX connector block.

13. A voltage and/or surge-current protector and grounding bar arrangement for use with a BIX connector block, comprising in combination:
- a BIX connector block having two rows of terminals which are laterally spaced apart with respect to each other so as to form a longitudinally extending channel therebetween;
- grounding bar means disposed within said longitudinally extending channel defined between said two laterally spaced rows of terminals and having a plurality of holes defined therein;
- a housing;
- voltage and/or surge-current protector means disposed within said housing;
- a plurality of tip/ring terminal contacts disposed within said housing for mating with opposed terminals of said BIX connector block, disposed upon opposite sides of said longitudinally extending channel, when said housing is mounted upon said BIX connector block;
- ground contact means disposed within said housing for connection to said voltage and surge-current protector means and to one of said plurality of holes defined within said grounding bar means; and
- disconnect means disposed within said housing for allowing testing and line-servicing without removal of said voltage and/or surge-current protector means from said BIX connector block.

14. A voltage and/or surge-current protector and grounding bar arrangement as claimed in claim 13, wherein said disconnect means comprises a long disconnect terminal contact, a short disconnect terminal contact, and a spring contact, said spring contact urging said short disconnect terminal contact into contact engagement with said long disconnect terminal contact when no testing is being performed.

15. A voltage and/or surge-current protector and grounding bar arrangement as claimed in claim 13, wherein an upper portion of said housing has a test port for receiving therein a test probe for permitting testing.

16. A voltage and/or surge-current protector and grounding bar arrangement as claimed in claim 13, wherein an upper portion of said housing has a recess for receiving therein a label strip so as to allow for single pair identification of up to 25 terminal-pairs which is visible without removal of said voltage and/or surge-current protector means from said BIX connector block.

17. A voltage and/or surge-current protector and grounding bar arrangement as claimed in claim 13, wherein said voltage and/or surge-current protector means comprises a pair of voltage suppressor means and a pair of sneak-current fuses so as to provide over-voltage and over-current protection for said BIX connector block.

18. A voltage and/or surge-current protector and grounding bar arrangement as claimed in claim 13, wherein said voltage and/or surge-current protector means comprises rectifying means, a pair of voltage suppressor means, and a pair of sneak-current fuses so as to provide over-voltage and over-current protection for said BIX connector block.

19. A voltage and/or surge-current protector and grounding bar arrangement for use with a BIX connector block, comprising:
- a BIX connector block having two rows of terminals which are laterally spaced apart with respect to each other so as to form a longitudinally extending channel therebetween;
- a grounding bar including an elongated flat horizontal intermediate section and a pair of terminal end sections integrally connected to the opposite ends of said intermediate section;
- said grounding bar being disposed within said longitudinally extending channel defined between said two laterally spaced rows of terminals, said two laterally spaced rows of terminals in said intermediate section having a plurality of holes defined therein; and
- protuberances located at ends of said BIX connector block for receiving therein corresponding vertical offsets on said terminal end portions of said grounding bar.

20. A voltage and/or surge-current protector and grounding bar arrangement as claimed in claim 19, wherein rectangularly-shaped apertures formed above and below said vertical offset through which said protuberances extend for fixedly securing said grounding bar within said longitudinally extending channel.

* * * * *